3,303,475
CONTROL SYSTEM
Herbert Hellerman, Yorktown Heights, and Kenneth E. Iverson, Mount Kisco, N.Y., assignors to International Business Machines Corporation, New York, N.Y., a corporation of New York
Filed Nov. 29, 1963, Ser. No. 326,768
8 Claims. (Cl. 340—172.5)

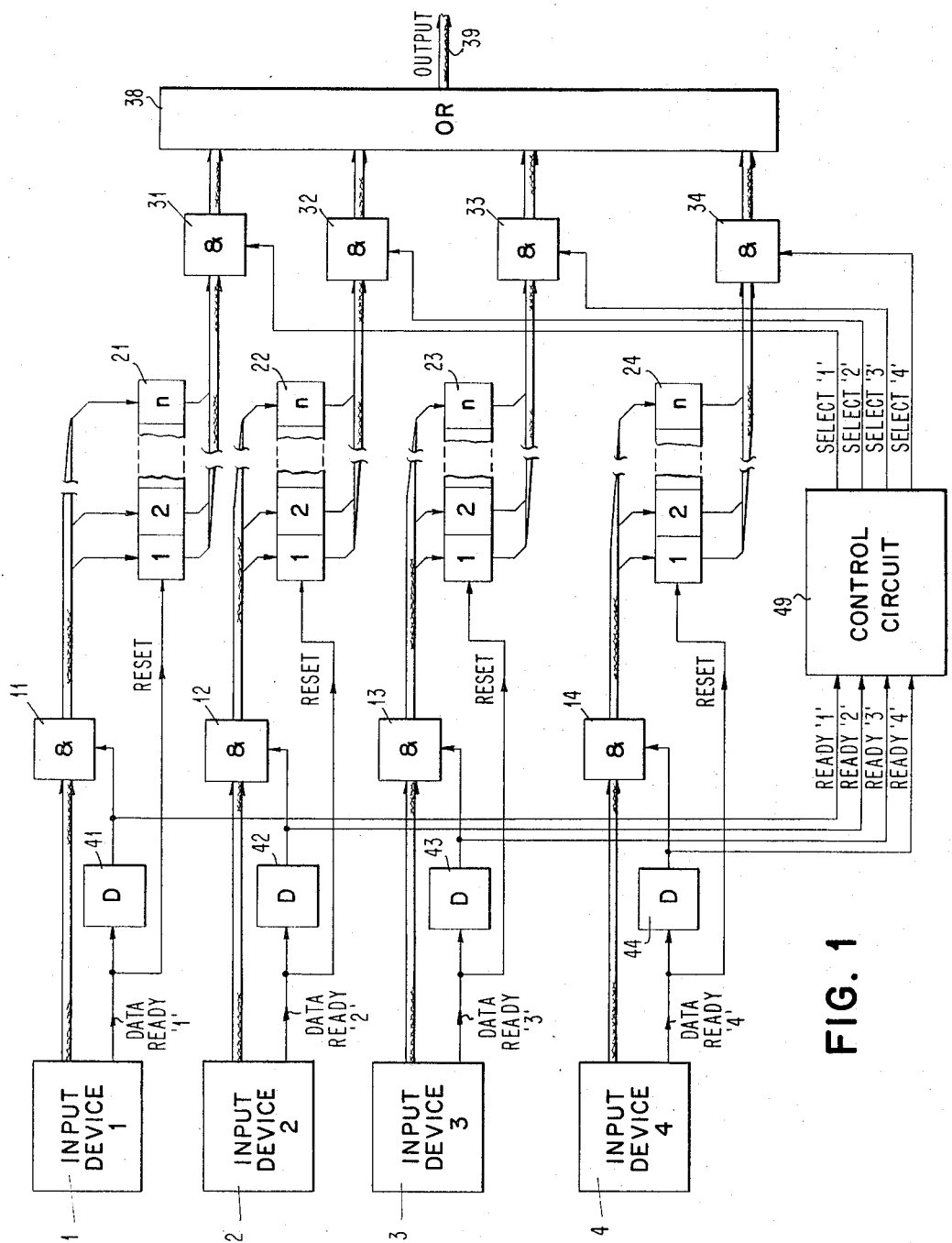

This invention is related to control systems and, in particular, to control systems for sampling a plurality of critically-timed data sources for transmission over a common channel.

Many relatively slow-speed data sources can be transmitted on a common high-speed channel by various multiplexing techniques. For example, when a computer is capable of assimilating data at a speed that is much greater than the rate at which an input device supplies the data, and when the timing is not critical, several input devices may be sequentially sampled. In another technique, the input devices may be sampled in the order of the relative speed at which data is provided, where the fastest device that is "ready" to provide an output is sampled during each cycle. These techniques are relatively inefficient when the input devices provide data at different rates. With a sampling frequency $f_s$, and data availability frequencies $f_1, f_2, \ldots, f_n$ for $n$ input devices, the maximum theoretical efficiency is achieved when $$f_s = f_1 + f_2 + \ldots + f_n$$

That is, during each sampling cycle, one of the input devices is sampled. Obviously, if $f_s < f_1 + f_2 + \ldots + f_n$, the system fails because data is generated faster than it can be sampled.

In the present invention, the maximum theoretical efficiency is achieved by a sampling technique wherein the input data which has the least remaining availability (least time left for sampling before the data will be replaced) is sampled during each cycle. The following example illustrates a typical condition wherein the inventive technique is operative and other known techniques fail. In the example, the sampling frequency $f_s$ equals one megacycle, and input device data availability frequencies $f_1, f_2, f_3$ and $f_4$ equal 333,333; 250,000; 200,000 and 200,000 cycles per second, respectively. Since $f_s$ exceeds the sum of $f_1, f_2, f_3$ and $f_4$, the maximum theoretical efficiency is not exceeded. In the following chart, the remaining number of sampling intervals for the four applied signals are illustrated. For example, since device 1 has an availability frequency of one third of the sampling frequency, it provides new data after every three sampling intervals.

One simple technique for sampling data that fails in the example is the technique of sequentially sampling each input device. Using this technique, the devices are sampled: 1 2 3 4 1 2 3 4 . . . and the data provided by device 1 during intervals 10 through 12 (underlined) is not sampled. In addition, devices 3 and 4 are occasionally sampled twice while the same data is present. Another data sampling technique that fails is the technique of sampling the input device that operates at the highest frequency and whose data has not yet been sampled. When the highest frequency device has been sampled, the device operating at the second highest frequency is sampled, etc. In this case the devices would be sampled:

1 3 2 1 4 3 1 2 4 1 2 3 1 4 2 1 3 0 1 2 3 1 2 4 where the "0" indicates that no data is sampled at that interval. The technique fails because the data provided by device 4 during intervals 19–23 (underlined) is not sampled.

In accordance with the present invention, the data having the least remaining availability is sampled during each interval with the following sampling sequence for the above example.

1 3 2 1 4 0 1 2 3 1 4 2 1 3 2 1 4 3 1 2 4 1 3 2 1

This technique provides successful sampling of all data. The "0" indicates that no data is sampled during the corresponding interval, and is a result of operating the system at lower than maximum efficiency (because $$f_1 + f_2 + f_3 + f_4$$

does not quite equal $f_s$). During this interval, data from another device with no critical timing requirements, could be applied to the common output channel.

In the present invention a count-down clock is associated with each input device. As new new data is available from an input device, the clock is reset to a value indicative of the number of sampling intervals during which the data will be available. (In the above example, the clocks are reset to 3, 4, 5 and 5 for input devices 1, 2, 3 and 4 respectively.) The values in the count-down clocks are each reduced by one after each sampling interval. During each interval, the input device having the lowest clock value is sampled if the data that is currently supplied by that input device has not been sampled. In this manner, the previously-unsampled input device having the least remaining availability is sampled at each interval.

It is thus an object of the present invention to show data sampling techniques which provide the maximum theoretical efficiency.

Another object is to show techniques for multiplexing data for transmission over a common channel wherein the applied data which has the least remaining availability is transmitted during each sampling interval.

A further object is to show techniques for multiplexing data from a plurality of input devices for transmission over a common channel, during sequential time intervals wherein clocks measure the remaining availability of data in each input device and cause the data having the least remaining availability to be transmitted at each time interval.

The foregoing and other objects, features and advantages of the invention will be apparent from the following more particular description of a preferred embodiment of the invention, as illustrated in the accompanying drawings.

| Device | Remaining Number of Sampling Intervals | | | | | | | | | | | | | | | | | | | | | | | | |
|---|---|---|---|---|---|---|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 |
| 1 | 3 | 2 | 1 | 3 | 2 | 1 | 3 | 2 | 1 | 3 | 2 | 1 | 3 | 2 | 1 | 3 | 2 | 1 | 3 | 2 | 1 | 3 | 2 | 1 | 3 |
| 2 | 2 | 1 | 4 | 3 | 2 | 1 | 4 | 3 | 2 | 1 | 4 | 3 | 2 | 1 | 4 | 3 | 2 | 1 | 4 | 3 | 2 | 1 | 4 | 3 | 2 |
| 3 | 5 | 4 | 3 | 2 | 1 | 5 | 4 | 3 | 2 | 1 | 5 | 4 | 3 | 2 | 1 | 5 | 4 | 3 | 2 | 1 | 5 | 4 | 3 | 2 | 1 |
| 4 | 3 | 2 | 1 | 5 | 4 | 3 | 2 | 1 | 5 | 4 | 3 | 2 | 1 | 5 | 4 | 3 | 2 | 1 | 5 | 4 | 3 | 2 | 1 | 5 | 4 |

In the drawings:

FIGURE 1 is a block diagram of a preferred embodiment of the invention.

Figures 2, 2B:
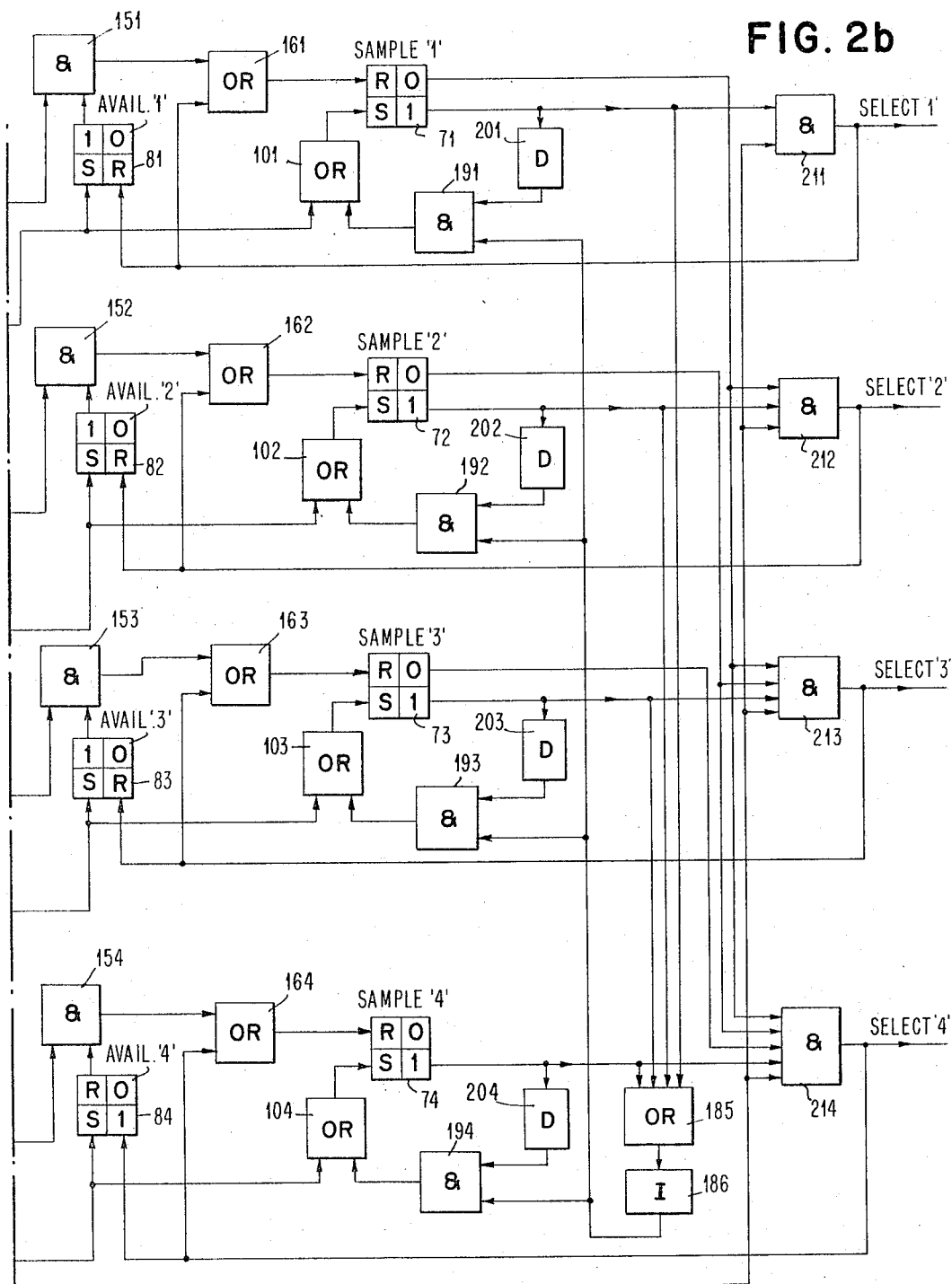
FIG. 2 is a diagram illustrating how FIGS. 2a–2b may be combined to form a detailed diagram of the control circuit shown in FIG. 1.
Figure 2A:
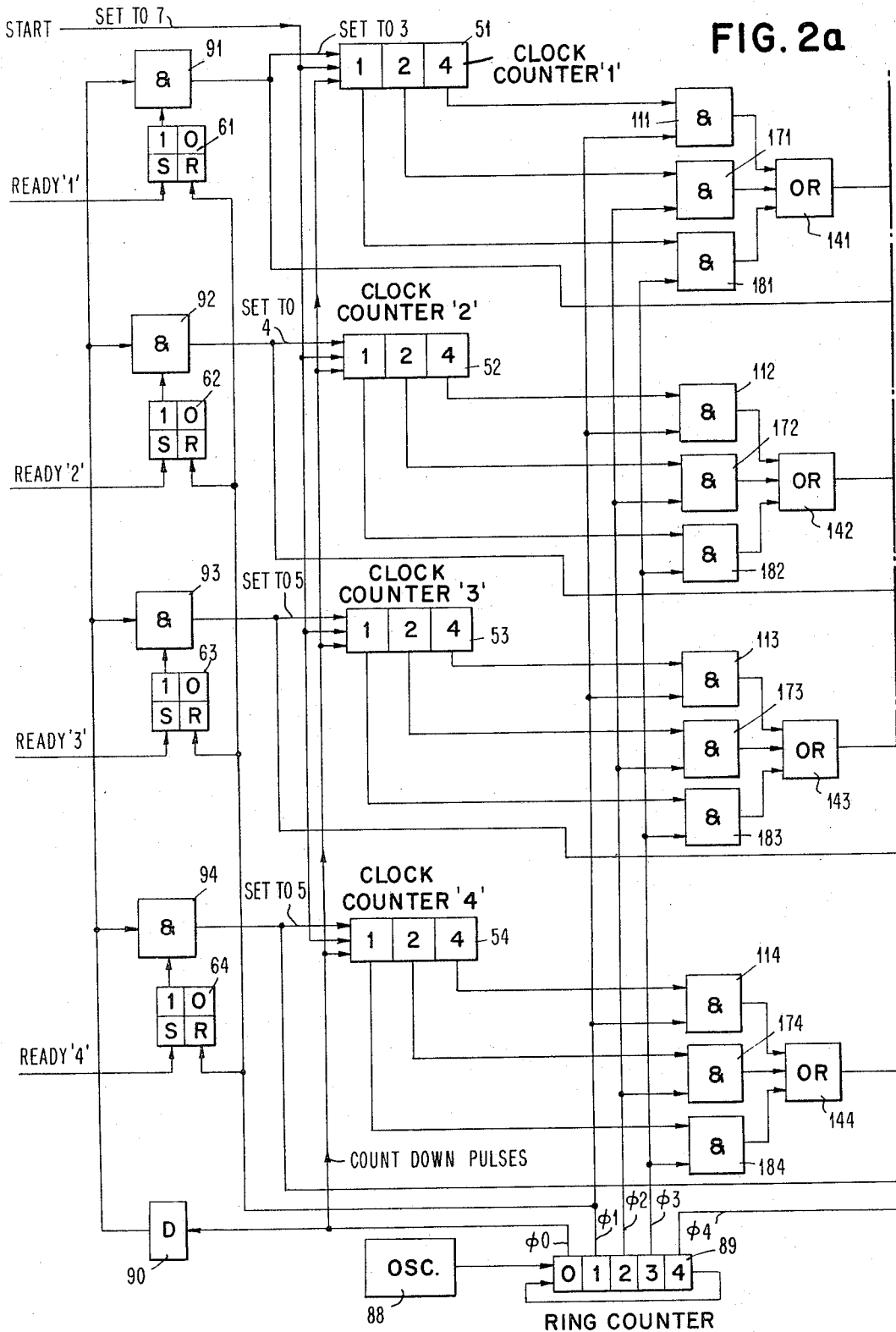

FIGS. 2a–2b when combined form a detailed diagram of the control circuit shown in FIG. 1.

Figure 3:
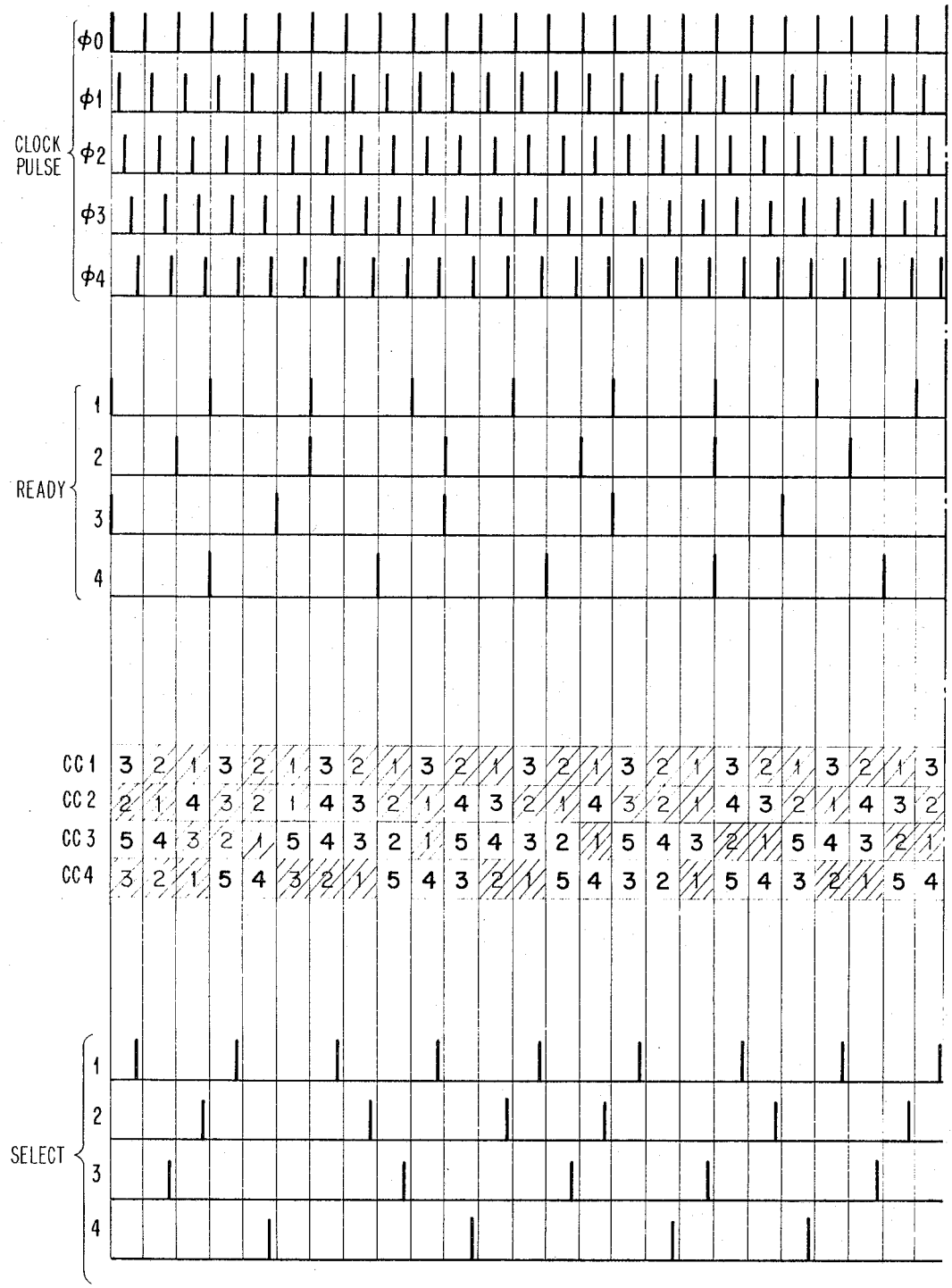

FIGURE 3 is a group of charts illustrating the system timing and operation for a typical example.

In FIGURE 1, four input devices 1, 2, 3 and 4 provide data through "and" gates 11, 12, 13 and 14 to buffer registers 21, 22, 23 and 24. The data in the registers are sampled by "and" gates 31, 32, 33 and 34 and applied through an "or" gate 38 as the multiplexed output on a cable 39.

Each input device also supplies a "data ready" signal when the device is prepared to supply data. These signals are applied to reset the corresponding buffer registers to zero, and are applied through delay circuits 41, 42, 43 and 44 to condition "and" gates 11, 12, 13 and 14 to regulate the operation of a control circuit. The delay insures that the buffer registers are set before the application of new data and before the operation of the control circuit 49.

The data in the buffer registers is sampled by "and" gates 31, 32, 33 and 34 which are conditioned by signals from the control circuit 49. This circuit monitors the remaining availability of the data from each input device and provides the "select" signals to "and" gate 31, 32, 33 or 34 such that the data in the buffer register corresponding to the input device having the least remaining availability is sampled during each time interval.

The control circuit is shown in detail in FIGS. 2a–2b. This circuit accepts the "ready" signals from delay circuits 41, 42, 43 and 44 (FIG. 1) and generates the "select" signals to condition "and" gates 31, 32, 33 and 34 (FIG. 1).

The control circuit contains four channels, one for each input device. Each channel contains, among other circuits, a three-bit clock counter 51, 52, 53, 54; a "ready" bistable device 61, 62, 63, 64; a "sample" bistable device 71, 72, 73, 74; and an "available" bistable device 81, 82, 83 84.

A recycling clock regulates the operation of the control circuit. This clock comprises an oscillator 88 which continuously generates pulses that are applied to shift the output of a recycling ring counter 89. Thus the ring counter sequentially generates output signals which are labelled $\phi_0$, $\phi_1$, $\phi_2$, $\phi_3$ and $\phi_4$. The relative timing of these signals is shown in FIG. 3.

Each "ready" signal is applied to its corresponding "ready" bistable devices 61, 62, 63 or 64 to place the device in its "1" (left) status. The operation of the system is described in conjunction with the previous example and the exemplary "ready" signals are shown in FIG. 3. For simplicity, synchronous input devices are illustrated and the "ready" signals coincide with the $\phi_0$ output of ring counter 89. The "1" output of each "ready" bistable device conditions the corresponding "and" gates 91, 92, 93, 94. The $\phi_0$ signal is applied through a delay circuit 90 to "and" gates 91, 92, 93 and 94 which, when conditioned, pass the signal to set the associated clock counters 51, 52, 53 and 54 to values corresponding to the number of clock cycles that the data from the input devices is available for sampling. In the example, clock counter 51 is set to "3," clock counter 52 is set to "4," and clock counters 53 and 54 are set to "5." Since the "ready" signals to bistable devices 61, 62, 63 and 64 occur at $\phi_0$ time, the $\phi_0$ signal is delayed before application to "and" gates 91, 92, 93 and 94 to insure that the bistable devices are not in the process of switching status when the "and" gates function. The delayed $\phi_0$ signal occurs before the subsequent $\phi_1$ signal. During the initial operation of the system, a "start" signal is applied to set each clock counter to "7" (its highest value) to avoid errors before the initial "ready" signals cause the clock counters to be set to their appropriate lower values.

Thus, as each input device signals its readiness, the corresponding clock counter is set to a value corresponding to the number of sampling durations (clock cycles) that exist before subsequent data is applied from the input device. Although the example is related to synchronous input devices, the system is capable of operating with unsynchronized devices. In this case, the "ready" signals occur at any time during a clock cycle and the clock counters are set at the occurrence of the subsequent delayed $\phi_0$ signal to values indicative of the minimum number of entire clock cycles which occur between successive "ready" signals.

The signals from "and" gates 91, 92, 93 and 94 also set the "available" bistable devices 81, 82, 83 and 84 and the "sample" bistable devices 71, 72, 73 and 74 (through a group of "or" gates 101, 102, 103 and 104) to their "1" status. The "ready" bistable devices 61, 62, 63 and 64 are reset to their "0" status by the $\phi_1$ signal from the ring counter 89.

During the occurrence of the $\phi_1$, $\phi_2$ and $\phi_3$ signals from the ring counter 89, the data in the clock counters 51, 52, 53 and 54 are monitored. The highest order position ("4") of each clock counter conditions a corresponding "and" gate 111, 112, 113, 114 when the value stored in the counter equals four or more. The $\phi_1$ signal is also applied to "and" gates 111, 112, 113 and 114 which, when conditioned, provided output signals through the corresponding one of a group of "or" gates 141, 142, 143 and 144 to a corresponding one of a group of "and" gates 151, 152, 153 and 154. Since the "available" bistable devices 81, 82, 83 and 84 are set to their "1" status when the corresponding "ready" signals are applied from the input devices, "and" gates 151, 152, 153 and 154 are conditioned and apply the signals from "or" gates 141, 142, 143, 144 through corresponding ones of another group of "or" gates 161, 162, 163 and 164 to reset the corresponding "sample" bistable devices 71, 72, 73, 74 to their "0" status. Thus, at the occurrence of the $\phi_1$ timing signal the "sample" bistable devices are reset to their "0" status in those channels wherein a value of four or more is contained in the clock counter.

During the occurrence of the $\phi_2$ timing signals, a group of "and" gates 171, 172, 173 and 174 pass the data in the second-order ("2") position of the clock counters through "or" gates 141, 142, 143 and 144, "and" gates 151, 152, 153 and 154, and "or" gates 161, 162, 163 and 164 to control the "sample" bistable devices 71, 72, 73 and 74. Thus, after the occurrence of the $\phi_2$ signal, all "sample" bistable devices are reset when the corresponding clock counters contain values of two or more (the "sample" bistable devices that were reset at $\phi_1$, time remain reset).

Similarly, the occurrence of the $\phi$ timing signal causes the data in the lowest order ("1") of each clock counter to affect the status of the "sample" bistable devices (through a group of "and" gates 181, 182, 183 and 184).

At some point in the above three-step procedure that is initiated by the $\phi_1$, $\phi_2$ and $\phi_3$ timing signals, all "sample" bistable devices 71, 72, 73 and 74 are reset to their "0" status. For example, if the lowest value contained in any clock counter equals two or more, all "sample" bistable devices are reset by the $1_2$ cycle. The "0" outputs of all "sample" bistable devices are applied through an "or" gate 185 to an inverter 186. When all 'sample" bistable devices are reset, the "or" gate provides a "0" output which is inverted into a "1" signal at the output of the inverter. This signal conditions a group of "and" gates 191, 192, 193 and 194. The "1" output of each "sample" bistable device is applied through one of a group of delay circuits 201, 202, 203 and 204 to the corresponding "and" gates 191, 192, 193 and 194. Thus, as soon as the "or" gate 185 senses that all "sample" bistable devices are reset, "and" gates 191, 192, 193 and 194 pass the previous status of these bistable devices ("1" signals for those devices which were set to their "1" status immediately before the time that the last device was reset to its "0" status). The signals from "and" gates 191, 192, 193 and 194 are passed by "or" gates to again set the corresponding "sample" bistable devices to their "1" status. When one clock counter contains a value lower than the values in all other clock counters, only its corresponding "sample" bistable device is set to its "1" status at the termination of the above-described operation (after the occurrence of the $\phi_3$ timing signal). When two or more clock counters contain equal values that are lower than the values in the remaining clock counters, the corresponding two or more "sample" bistable devices are in their "1" status at the termination of the operation.

By way of example, consider all clock counters to be reset by the simultaneous occurrence of all "ready" signals. (Clock counter 51 contains "3," clock counter 52 contains "4," clock counters 53 and 54 contain "5.") The $\phi_1$ timing signal results in the resetting of "sample" bistable devices 72, 73 and 74 to their "0" status because clock counters 52, 53 and 54 contain values of four or more. The $\phi_2$ timing signal causes "sample" bistable device 71 to be reset momentarily. At this instant, all "sample" bistable devices are reset and a signal is generated by inverter 186 which re-establishes the status of the "sample" bistable devices to that which existed immediately before the $\phi_2$ timing signals; that is bistable device 71 is set to its "1" status and bistable devices 72, 73 and 74 remain reset to their "0" status. The $\phi_3$ timing signal again causes bistable device 71 to be momentarily reset, but the signal from inverter again sets the device. Thus, after the occurrence of the $\phi_3$ timing signal, only "sample" bistable device 71 is set to its "1" status, which indicates that the corresponding clock counter 51 contains the lowest value. As another example, consider the operation that occurs when two clock counters contain equal low values; e.g., when clock counters 51 and 52 contain the value "3" and clock counters 53 and 54 contain the value "5." In this case, the $\phi_1$ timing signal causes "sample" bistable devices 73 and 74 to be reset to their "0" status. The $\phi_2$ timing signal causes "sample" bistable devices 71 and 72 to be momentarily reset, but the signal from inverter 186 returns bistable devices 71 and 72 to their "1" status. Similarly, at the occurrence of the $\phi_3$ timing signal, bistable devices 71 and 72 are momentarily reset and then returned to their "1" status. Thus, after the occurrence of the $\phi_3$ timing signal, "sample" bistable devices 71 and 72 are set to their "1" status, indicating that the values contained in corresponding clock counters 51 and 52 are equal to each other and lower than the values contained in clock counters 53 and 54.

The $\phi_4$ timing signal causes a "select" signal to occur on the appropriate output lead. When only one "sample" bistable device remains set to its "1" status, the corresponding "and" gate 211, 212, 213, 214 is conditioned by the signal from the "1" output of this "sample" bistable device and, in the case of "and" gates 212, 213 and 214, by one or more signals from the "0" outputs of other "sample" bistable devices. The $\phi_4$ timing signal is applied to each "and" gate 211, 212, 213 and 214, and the conditioned gate generates the output "select" signal. When more than one "sample" bistable device remain set to their "1" status after the $\phi_3$ timing signal, only the "and" gate 211, 212, 213, 214 with the lowest reference numeral is conditioned and the other one or more "and" gates are blocked by the absence of a signal from the "0" output of the "sample" bistable device which corresponds to the conditioned "and" gate. For example, when "sample" bistable devices 72 and 73 remain set to their "1" status, "and" gate 212 is conditioned and "and" gate 213 is blocked by the absence of a signal from the "0" output of bistable device 72. In this manner, only one "select" signal is generated at the occurrence of the $\phi_4$ timing signal.

The "select" signal is used to condition one of the group of "and" gates 31, 32, 33 and 34 (FIG. 1) as described above.

The "select" signal is also applied to reset the corresponding "available" bistable device 81, 82, 83, 84 and, through an "or" gate 161, 162, 163, 164, to reset the corresponding "sample" bistable device 71, 72, 73, 74. Thus, the corresponding "and" gate 151, 152, 153, 154 is blocked and the data from the corresponding clock counter is prevented from affecting the operation of the "sample" bistable devices until new data and a "ready" signal are applied from the corresponding input device. This insures that the same buffer register 21, 22, 23, 24 (FIG. 1) is not sampled more than once while the same data is present.

The next $\phi_0$ timing signal is applied to all clock counters 51, 52, 53, 54 to decrement their stored value by one. The subsequent $\phi_1$, $\phi_2$, $\phi_3$ and $\phi_4$ timing signals then control the circuits to provide another "select" signal for the next sampling interval.

The operation of the control circuit for the originally-described example is illustrated by the $CC_1$, $CC_2$, $CC_3$, $CC_4$ and "Select 1, 2, 3 and 4" data in FIGURE 3. The CC (clock counter) data indicates the values stored in the clock counters and corresponds to the data in the above-described table. Shading (diagonal lines) is employed to indicate the sampling intervals during which data is not "available"; that is, the corresponding buffer registers 21, 22, 23 and 24 (FIG. 1) have been sampled and new data has not been presented. (During these "unavailable" intervals, the "available" bistable devices 81, 82, 83 and 84 are reset to their "0" status.) Thus, in the example, each data channel is sampled during the final interval before each series of shaded intervals. For example, during the first sampling interval, channel 1 is sampled; during the second interval, channel 3 is sampled; during the third interval, channel 2 is sampled; etc. In. FIG. 3, it is presumed that channels 2 and 4 ($CC_2$ and $CC_4$) were sampled during earlier intervals that are not illustrated. The "Select 1, 2, 3, 4" data in FIGURE 3 indicates the times of occurrence of the "select" signals from "and" gates 211, 212, 213 and 214 (FIG. 2). These signals coincide with $\phi_4$ timing signals as described above.

Although the invention is described in conjunction with four input devices additional devices may be employed within the limits of the maximum theoretical efficiency (as described above).

While the invention has been particularly shown and described with reference to a preferred embodiment thereof, it will be understood by those skilled in the art that various changes in form and details may be made therein without departing from the spirit and scope of the invention.

What is claimed is:
1. A control system for multiplexing the data from a plurality of devices for transmission in a common channel comprising, in combination:
  means for indicating the remaining time availability of the data from each of the plurality of devices, for each transmission interval;
  means for determining which of the plurality of devices is indicated by said indicating means as having the minimum remaining time availability;
  and means for selecting for transmission, during each transmission interval, the data from the device which is determined to have the minimum remaining time availability.

2. The apparatus described in claim 1, including means for inhibiting a device who's last-presented data has already been selected for transmission from being selected by said selecting means.

3. The apparatus described in claim 2, wherein the indicating means comprises clock counters which are reset to a value equal to the minimum number of transmission intervals that exist between successive applications of data by the corresponding devices and which are decremented by one during each successive transmission interval.

4. The apparatus described in claim 2, including means operable when a plurality of minimum remaining time availabilities are equal, for permitting only one of the devices having a minimum remaining time availability to be selected, according to a predetermined priority.

5. A control system for multiplexing the data from a plurality of devices for transmission in a common channel comprising, in combination:
   a plurality of clock counters, one corresponding to each device, where each clock counter is reset to a value equal to the minimum number of transmission intervals that exist between successive applications of data by the corresponding device;
   means for decrementing by one of the value stored in each clock counter during each transmission interval;
   a plurality of availability indicators, one corresponding to each device, where each availability indicator provides a predetermined indication when the last-presented data from the corresponding device has not yet been selected for transmission;
   and a control circuit responsive to the values contained in the clock counters and the indications provided by the indicators for selecting for transmission, during each transmission interval, the data from the device corresponding to the clock counter which contains a minimum value and which corresponds to an indicator which provides an indication.

6. The apparatus described in claim 5 including means operable, when a plurality of clock counters, which correspond to indicators that provide indications, contain equal minimum values, for permitting only one of the corresponding devices to be selected, according to a predetermined priority.

7. A control system for multiplexing the data from a plurality of devices for transmission in a common channel comprising, in combination:
   a plurality of buffer registers, one for each device;
   a first plurality of gating means, each for passing data from a device to the corresponding buffer register when the data is available;
   a plurality of clock counters, one corresponding to each device, where each clock counter is reset when the corresponding data is available to a value equal to the minimum number of transmission intervals that exist between successive applications of data by the corresponding device;
   means for decrementing by one the value stored in each clock counter during each transmission interval;
   a plurality of availability indicators, one corresponding to each device, where each availability indicator provides a predetermined indication when the last-presented data from the corresponding device has not yet been selected for transmission;
   a control circuit responsive to the values contained in the clock counters and the indications provided by the indicators for generating, for each transmission interval, an indication of the device whose clock counter contains a minimum value among those devices whose indicators provide indications;
   and a second plurality of gating means, each responsive to the indication from the control circuit for passing data from a buffer register to the common channel.

8. The apparatus described in claim 7 including means operative, when a plurality of clock counters which correspond to indicators that provide indications, contain equal minimum values, for permitting the control circuit to generate an indication of only one corresponding device, according to a predetermined priority.

References Cited by the Examiner

UNITED STATES PATENTS

| | | | |
|---|---|---|---|
| 2,495,739 | 1/1950 | Labin et al. | 179—15 |
| 2,564,419 | 8/1951 | Bown | 179—15 |
| 3,046,346 | 7/1962 | Kramer | 179—15 |
| 3,079,082 | 2/1963 | Scholten | 340—172.5 |
| 3,099,818 | 7/1963 | Murray | 340—172.5 |
| 3,238,305 | 3/1966 | Bergmann et al. | 179—15 |

ROBERT C. BAILEY, *Primary Examiner.*

P. L. BERGER, P. J. HENON, *Assistant Examiners.*